United States Patent
Raffalt et al.

(10) Patent No.: US 6,642,722 B2
(45) Date of Patent: Nov. 4, 2003

(54) METHOD AND ARRANGEMENT FOR LEVEL MEASURING

(75) Inventors: Felix Raffalt, Hausach (DE); Adrian Frick, Wolfach (DE)

(73) Assignee: VEGA Grieshaber KG, Schiltach (DE)

( * ) Notice: Subject to any disclaimer, the term of this patent is extended or adjusted under 35 U.S.C. 154(b) by 0 days.

(21) Appl. No.: 09/793,391

(22) Filed: Feb. 27, 2001

(65) Prior Publication Data

US 2002/0057094 A1 May 16, 2002

(30) Foreign Application Priority Data

Nov. 14, 2000 (DE) ......................................... 100 56 353

(51) Int. Cl.⁷ .............................................. G01R 27/04
(52) U.S. Cl. ...................................................... 324/635
(58) Field of Search ................................ 324/633, 635; 73/290 V, 290 R; 137/386, 392; 340/603, 610, 615, 618, 620

(56) References Cited

U.S. PATENT DOCUMENTS

| 4,788,466 A | * | 11/1988 | Paul et al. ................... 310/316 |
| 5,365,178 A | * | 11/1994 | Van Der Pol ................ 324/644 |
| 5,743,134 A | * | 4/1998 | Dreyer ....................... 73/290 V |
| 6,148,665 A | * | 11/2000 | Getman et al. ........... 73/290 V |

FOREIGN PATENT DOCUMENTS

| DE | 0042 33 1885 | 1/1994 |
| DE | 42 32 659 | 3/1994 |
| DE | 0044 39 879 | 2/1996 |

* cited by examiner

Primary Examiner—Safet Metjahic
Assistant Examiner—Etienne P LeRoux
(74) Attorney, Agent, or Firm—Nath & Associates PLLC; Gary M. Nath; Marvin C. Berkowitz

(57) ABSTRACT

The invention pertains to a level measuring by an apparatus has oscillating fork (1) that is excited to oscillate by an oscillator circuit that, for example, is realized in the form of a series circuit consisting of an input amplifier (2), a band filter (3) and an output amplifier (4). An identifying element (6) is assigned to the oscillating fork (1), with the identifying element transmitting the fundamental frequency of the oscillating fork (1) to the oscillator circuit (2, 3, 4) in coded form. In addition, the identifying element (6) transmits the fundamental frequency of the oscillating fork (1) to the control input of a frequency evaluation circuit (5), the input of which is connected to the output of the oscillator circuit (2, 3, 4). Consequently, the parameters of the band filter (3), as well as of the frequency evaluation circuit (5), are optimally adjusted to the fundamental frequency of the oscillating fork (1).

17 Claims, 3 Drawing Sheets

METHOD AND ARRANGEMENT FOR LEVEL MEASURING

DESCRIPTION

Figure 1:
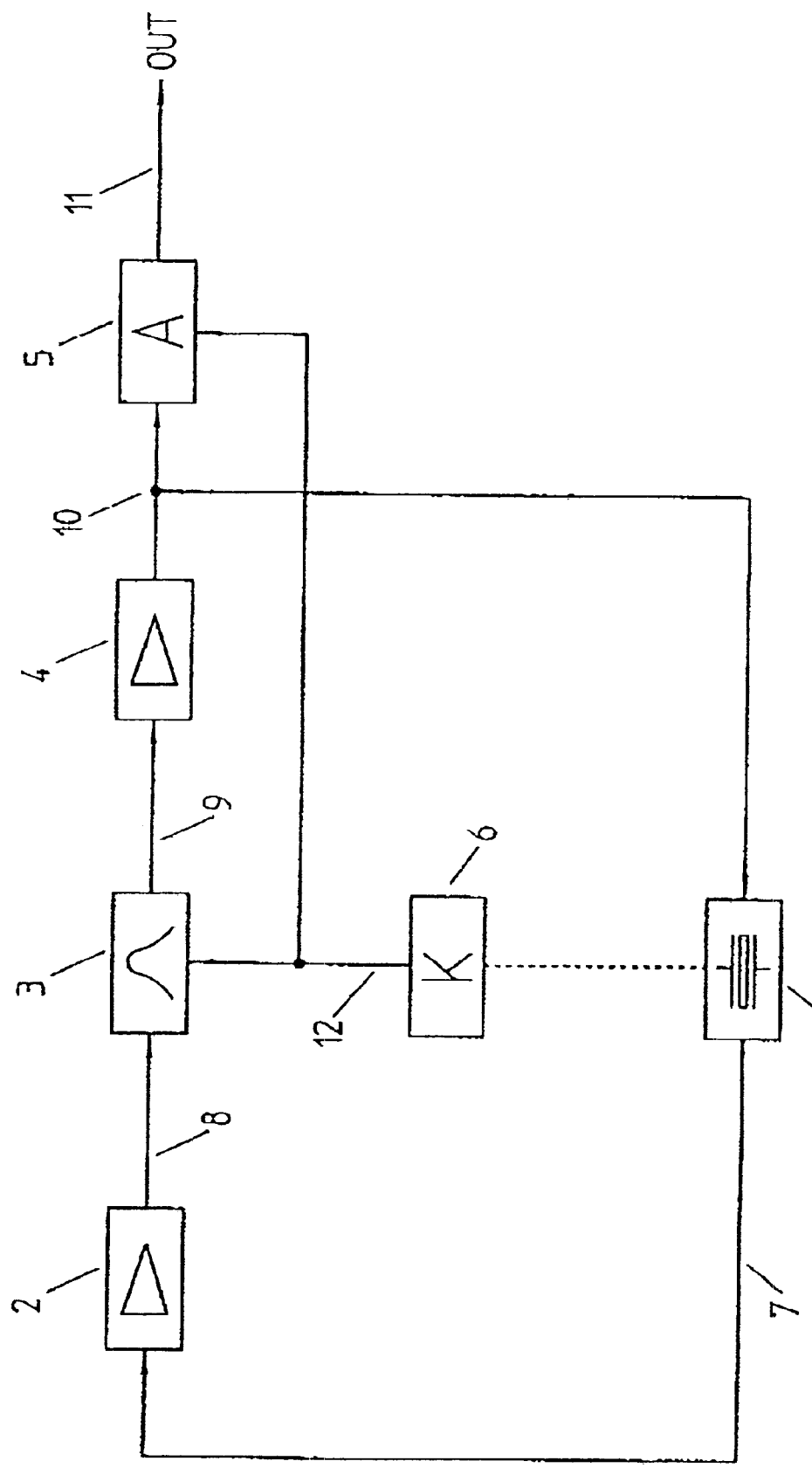

The invention pertains to a method for level measuring by means of an oscillating fork that is excited to oscillate by an oscillator circuit and to which an identifying element is assigned; namely, according to the characteristics of the preamble of claim 1.

The invention also pertains to an arrangement for level measuring by means of an oscillating fork that is excited to oscillate by an oscillator circuit and to which an identifying element is assigned; namely, according to the characteristics of the preamble of claim 9.

The resonant frequency of oscillating forks that, for example, are used for level measuring is subject to scatter due to casting and processing tolerances. The electronic circuit that evaluates this resonant frequency needs to be adapted to this frequency scatter by means of suitable measures.

In this context, a first state of the art is described in DE 42 32 659. In this case, an identifying element is assigned to the oscillating fork, with the identifying element forwarding the value of the oscillating fork frequency in a coded fashion to the frequency evaluation stage of the sensor electronic. The frequency evaluation stage adapts its switching point to the coded value such that all sensors have the same filling level response height despite different fundamental frequencies of the oscillating forks.

A second state of the art is described in DE 198 24 370 A1. In this case, two identifying elements are assigned to the oscillating fork, with the two identifying elements respectively adjusting one reference band filter in the sensor electronic, and with said reference band filter being connected to the regenerative oscillator circuit instead of the oscillating fork. The generated reference frequencies are transmitted to the evaluation device that adapts its own frequency switching point to the transmitted reference value such that the same filling level response height is always achieved despite different fundamental frequencies of the oscillating forks.

The disadvantage of both aforementioned methods can be seen in the fact that although the frequency evaluation stage is adapted to the manufacturing tolerances of the oscillating fork, the regenerative oscillator that serves to excite the oscillating fork undergoes no adaptation.

In practical applications, the fundamental band filter contained in the regenerative oscillator was until now designed to be so broad with respect to its frequency response that it covers the fundamental frequencies of all oscillating forks that lie in the respective range of manufacturing tolerances.

However, this leads to problems in miniaturized oscillating forks that, for example, only have a prong length of 40 mm. Due to their inferior oscillatory properties, oscillating forks with such a short length increase the demands on the regenerative oscillator. If the fundamental band filter is designed to be excessively broad, problems in the oscillation build-up of the fork occur when the power supply is switched on. If the fundamental band filter is designed to be excessively narrow, the oscillating frequency of the fork is excessively distorted by the regenerative oscillator if the fundamental frequency values of the oscillating fork respectively lie at the upper or the lower end of the scatter range. This inevitably results in the oscillating fork being excited next to its resonant frequency. Depending on the tolerance value of the fork, this may, under certain circumstances, result in prevention of the output of the full level message or the empty level message, respectively.

The aforementioned problems occur, in particular, with oscillating forks that are coated with plastic or enamel for reasons of corrosion protection, as well as with forks that are polished to a mirror finish and used for food applications. In addition to the broader scatter ranges of their fundamental frequency, forks of this type frequently have an asymmetric mass distribution between the prongs of the fork which is caused by the coating and polishing processes, respectively. Analogously, oscillating forks for high-temperature applications increase the demands on the regenerative oscillator in order to be able to cover the entire temperature range with constant measuring characteristics.

The method according to the invention is based on the objective of developing an arrangement that makes it possible to compensate mechanical tolerances with electronic means.

With respect to the method, this objective is attained with the characteristics of claim 1.

With respect to the device, this objective is attained with the characteristics of claim 9.

Figure 2:
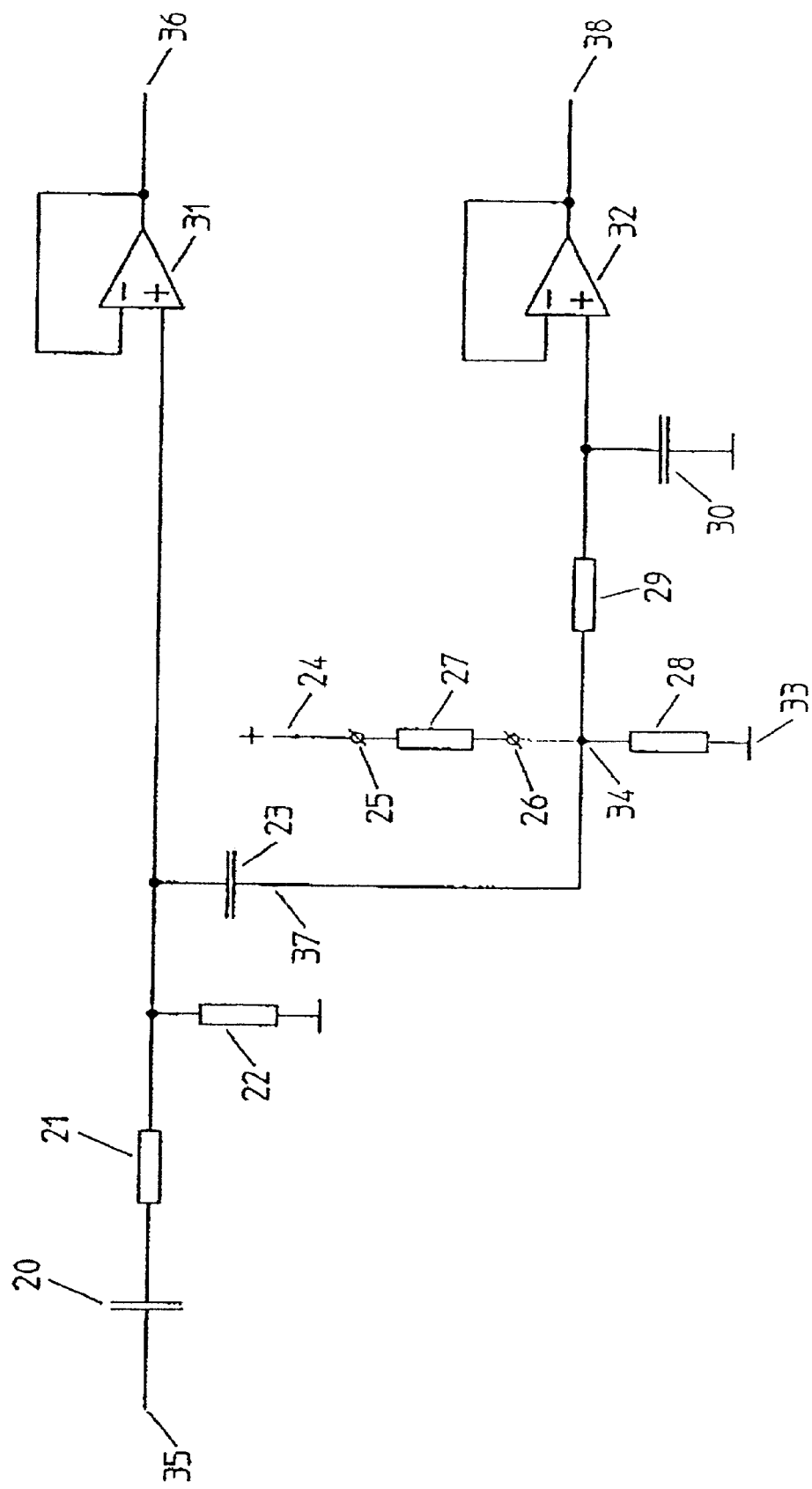

The invention is described in greater detail below. The figures show:

FIG. 1, a block diagram of the method according to the invention;

FIG. 2, a circuit diagram of a first embodiment, and

Figure 3:
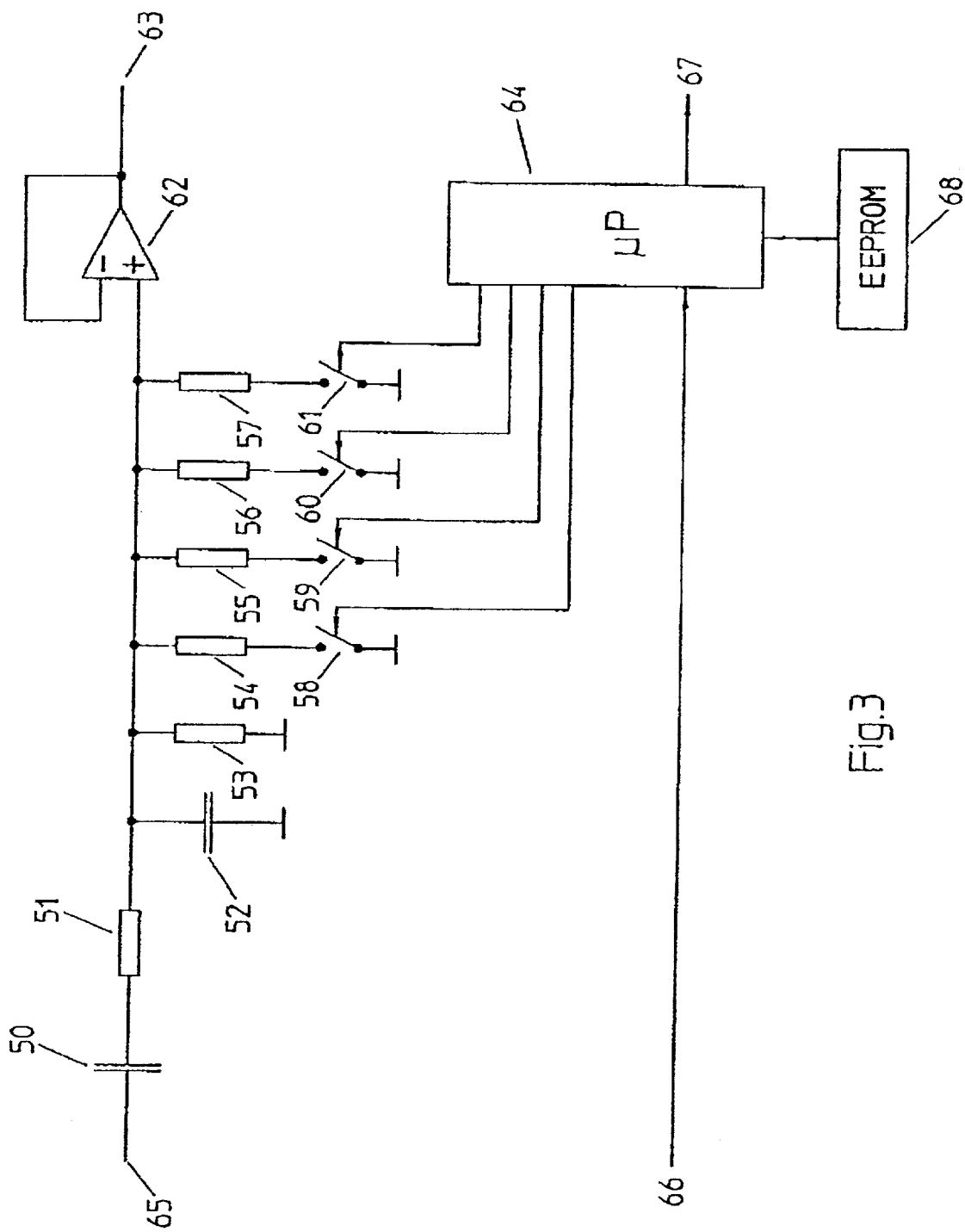

FIG. 3, a circuit diagram of a second embodiment.

The block diagram according to FIG. 1 shows a simplified representation of an oscillating fork filling level sensor. The oscillation detection signal 7 generated by the oscillating fork 1 is fed to the input amplifier 2, the output of which controls the band filter 3. The band filter 3 serves to ensure that the oscillating fork 1 is only excited in its fundamental oscillating mode, with frequencies of harmonic oscillations being suppressed by the band filter 3. The filter output signal 9 controls the output amplifier 4, the output voltage 10 of which is used to excite the oscillating fork 1 to oscillate. Consequently, the components 1, 2, 3, 4 represent an automatically oscillating regenerative oscillator circuit. The element that defines the frequency is the oscillating fork 1, with the components 2, 3, 4 forming the regenerative oscillator.

The signal 10 also serves to control the frequency evaluation stage 5. The frequency evaluation stage generates an empty message, a fall message or a defect message at its output 11 depending on the frequency of the signal 10.

An identifying element 6 is spatially assigned to the oscillating fork. This identifying element contains the individual value of the fundamental frequency of the oscillating fork 1 in a coded fashion. The identifying element 6 may consist of an analog component, e.g., a resistor or a capacitor of a certain value. Alternatively, the identifying element may consist of a digital component, e.g., a binary-coded switch or a semiconductor memory.

The identifying element 6 is connected to the band filter 3 with its connecting line 12 and acts upon said band filter in such a way that it defines its frequency response in dependence on its coded value. The transmission characteristic of the band filter 3 is, based on the identifying element 6, adjusted to the value that is most favorable for the operation of the oscillating fork 1 at its actual resonant frequency. Due to this measure, the band filter 3 does not have to cover a series of different oscillating forks, but is optimized to the respectively connected oscillating fork with respect to its frequency response.

The frequency evaluation stage 5 is preferably also connected to the same identifying element 6 such that its frequency switching thresholds are adapted to the oscillating fork 1.

For this purpose, the band filter 3 and the frequency evaluation stage 5 are designed in such a way that they both contact the identifying element 6 via the same line 12, namely, without the mutual influence of stages 3 and 5 occurring. FIG. 2 shows a first embodiment of the evaluation of the identifying element 6.

The identifying element 6 is realized in the form of a resistor 27 that is connected to a circuit section of the band filter 3 and the frequency evaluation stage 5 by means of terminals 25, 26. The resistor 27 forms a voltage divider that lies together with a resistor 28 between the plus potential 24 and the ground 33. If the resistor 27 changes, the voltage potential, as well as the impedance, changes at point 34.

The components 20, 21, 22, 23 form a bandpass filter and represent a section of the band filter 3. The signal to be filtered is supplied at point 35, with the filtered signal being retapped at point 36. The operational amplifier 31 serves as an impedance transformer in order to prevent ensuing stages from influencing the filter section. The capacitor 23 which defines the frequency is not conventionally connected to the circuit ground with its terminal 37, but rather to the frequency defined by the resistor 27 at point 34. The frequency response of the filter section 20, 21, 22, 23 can be adjusted by means of the resistor 27 in this fashion.

The d.c. voltage at point 34 is liberated from the a.c. voltage component introduced by the capacitor 23 with the aid of the low pass 29, 30 and, after an impedance transformation by the operational amplifier 32, is available as the d.c. voltage 38 which is defined by the resistor 27 and serves for adjusting the switching point of the frequency evaluation stage 5.

FIG. 3 shows a second embodiment of the evaluation of the identifying element 6.

In this case, the identifying element 6 is realized in the form of an EEPROM semiconductor memory 68 and read by means of a microprocessor 64. The components 50, 51, 52, 53 form a bandpass filter, the frequency response of which can be controlled by connecting the resistors 54, 55, 56, 57 by means of the semiconductor switches 58, 59, 60, 61. The microprocessor 64 switches on the semiconductor switches 58–61 in dependence on the memory contents of EEPROM 68. The band filter output signal, the impedance of which was transformed by means of the operational amplifier 62, is tapped at point 63.

The function of the frequency evaluation stage 5 is carried out in the microprocessor 64, the input 66 of which receives the signal 10. The signal 11 is present at the output 67. The value of the frequency switching threshold is calculated by the microprocessor 64 based on the memory content of EEPROM 68.

The method according to the invention is, in addition to oscillating forks, also suitable for oscillating rods and other mechanically oscillating sensors.

In addition to adjusting the frequency response of the regenerative oscillator, it is also possible to adjust its phase response and amplification factor by means of the identifying element 6 in order to achieve an operation of the oscillating element 1 at the optimal operating point.

In addition to its use in closed regenerative oscillator circuits, the method according to the invention may also be utilized in non-regenerative structures. In this case, the identifying element 6 adjusts the generator that excites the oscillating element 1 with respect to suitable parameters, e.g., frequency and amplitude. In the intermittent mode, the identifying element 6 may also contain data regarding the oscillation build-up time and the oscillation decay time or the oscillation quality of the oscillation element 1, respectively, with this data being used for ensuring an optimal excitation and evaluation of the oscillations.

The identifying element 6 may also contain data regarding several oscillation modes of the oscillating element 1. These data are used for improving the targeted excitation of the desired mode or for achieving a multi-mode operation of the sensor.

The identifying element 6 may also serve to store general data regarding the oscillation sensor, e.g., coatings, sensor materials, temperature range, sensor length, process connections and serial number. In addition to an adjustment of the excitation and evaluation electronics, these data may also be used for visualization purposes. For example, the output of these data via a field bus system would make it possible to precisely identify the type of sensor from a control room. Since the identifying element 6 is assigned to the sensor mechanism, all data of the sensor mechanism are preserved when the electronics are exchanged. The identifying element 6 may also serve for redundant storage of sensor adjustments. If the electronics are exchanged, the new electronics can automatically adjust to the old, defective electronics by reading the data stored in the identifying element 6.

What is claimed is:

1. Apparatus for level measuring comprising:
   a mechanically oscillating sensor, having an identifying element assigned thereto and containing a coded individual value of a fundamental frequency of the mechanically oscillating sensor;
   an oscillator circuit that excites the mechanically oscillating sensor, an output of the oscillator circuit being connected to an input of a frequency evaluation circuit; and
   further comprising a band filter connected to the identifying element;
   wherein the identifying element acts upon the band filter and defines its response based on the coded value; and
   whereby circuit parameters of the oscillator circuit can be influenced by the identifying element and the band.

2. Apparatus according to claim 1, wherein the oscillator circuit further comprises a series circuit consisting of an input amplifier, the band filter and an output amplifier.

3. Apparatus according to claim 2, wherein an output of the identifying element is connected to a control input of the band filter.

4. Apparatus according to claim 3, wherein the identifying element comprises a resistor, terminals of which are connected to the band filter.

5. Apparatus according to claim 2, wherein the identifying element comprises a memory.

6. Apparatus according to claim 5, wherein the band filter comprises a bandpass filter having a capacitor; and further comprising:
   a plurality of resistors having corresponding controllable switches, whereby ones of the resistors can be switched parallel to the capacitor the respective corresponding ones of the controllable switches; wherein
   control outputs of a microprocessor are connected to control inputs of the controllable switches; and
   the microprocessor is connected to the memory in which the fundamental frequency of the mechanically oscillating sensor is stored.

7. Apparatus according to claim 5, wherein the memory comprises an EEPROM.

8. Apparatus according to claim 1, wherein the identifying element acts upon the band filter and defines its frequency response based on the coded value.

9. Apparatus according to claim 1, wherein the identifying element acts upon the band filter and defines its phase response based on the coded value.

10. Apparatus according to claim 1, wherein the identifying element acts upon the band filter and defines its amplification factor based on the coded value.

11. Apparatus according to claim 1, wherein the oscillator circuit comprises a regenerative oscillator.

12. Apparatus according to claim 1, wherein the identifying element contains data regarding several oscillation modes of the mechanically oscillating sensor for improving a targeted excitation of a desired mode or for multi-mode operation of the mechanically oscillating sensor.

13. Apparatus according to claim 1, wherein the identifying element stores general data regarding the mechanically oscillating sensor.

14. Apparatus according to claim 13, wherein the general data includes ones of coatings, sensor materials, temperature range, sensor length, process connections and serial number.

15. Apparatus according to claim 14, further comprising a field bus system connected to the identifying element whereby a type of the mechanically oscillating sensor can be precisely identified from a control room.

16. Apparatus according to claim 13, wherein all stored data of the mechanically oscillating sensor are preserved when electronics are exchanged.

17. Apparatus according to claim 16, wherein the identifying element provides redundant storage of adjustments of the mechanically oscillating sensor whereby when old electronics are exchanged new electronics automatically adjust to the old electronics by reading the data stored in the identifying element.

* * * * *

UNITED STATES PATENT AND TRADEMARK OFFICE
CERTIFICATE OF CORRECTION

PATENT NO.   : 6,642,722 B2
DATED        : November 4, 2003
INVENTOR(S)  : Raffalt et al.

It is certified that error appears in the above-identified patent and that said Letters Patent is hereby corrected as shown below:

Column 4,
Line 34, change "band" to -- band filter --.
Line 51, after "capacitor" insert -- by --.

Signed and Sealed this

Twenty-third Day of December, 2003

JAMES E. ROGAN
*Director of the United States Patent and Trademark Office*